(12) United States Patent
Hardy (10) Patent No.: US 9,009,133 B2
(45) Date of Patent: Apr. 14, 2015

(54) METHODS AND SYSTEMS FOR FORMULATING AND EXECUTING CONCEPT-STRUCTURED QUERIES OF UNORGANIZED DATA (75) Inventor: William Christopher Hardy, Arlington, VA (US)

(73) Assignee: Leidos, Inc., Reston, VA (US)

( * ) Notice: Subject to any disclaimer, the term of this patent is extended or adjusted under 35 U.S.C. 154(b) by 1137 days.

(21) Appl. No.: 11/541,882

(22) Filed: Oct. 2, 2006

(65) Prior Publication Data

US 2008/0082501 A1    Apr. 3, 2008

(51) Int. Cl.
*G06F 17/30* (2006.01)
*G06F 7/00* (2006.01)

(52) U.S. Cl.
CPC .... *G06F 17/30389* (2013.01); *G06F 17/30864* (2013.01)

(58) Field of Classification Search
USPC .............................................. 707/3
See application file for complete search history.

(56) References Cited

U.S. PATENT DOCUMENTS

| | | | |
|---|---|---|---|
| 6,185,550 B1 * | 2/2001 | Snow et al. ........................... 1/1 |
| 6,970,881 B1 * | 11/2005 | Mohan et al. ......................... 1/1 |
| 2003/0033275 A1 * | 2/2003 | Alpha et al. ...................... 707/1 |
| 2005/0149502 A1 * | 7/2005 | McSherry ......................... 707/3 |
| 2005/0216447 A1 * | 9/2005 | Talib et al. ........................ 707/3 |
| 2005/0222989 A1 * | 10/2005 | Haveliwala et al. ............... 707/3 |
| 2005/0267871 A1 * | 12/2005 | Marchisio et al. ................ 707/3 |
| 2006/0004712 A1 * | 1/2006 | Hakala et al. ..................... 707/3 |
| 2006/0026145 A1 * | 2/2006 | Beringer et al. .................. 707/3 |
| 2006/0031195 A1 * | 2/2006 | Patterson .......................... 707/3 |
| 2006/0031210 A1 * | 2/2006 | Allen et al. ....................... 707/3 |
| 2006/0053098 A1 * | 3/2006 | Gardner et al. ................... 707/3 |
| 2006/0053104 A1 * | 3/2006 | Ferrari et al. ..................... 707/3 |
| 2006/0064411 A1 * | 3/2006 | Gross et al. ....................... 707/3 |
| 2006/0106762 A1 * | 5/2006 | Caracas et al. ................... 707/3 |
| 2006/0190436 A1 * | 8/2006 | Richardson et al. ............. 707/3 |
| 2006/0195425 A1 * | 8/2006 | Deem et al. ....................... 707/3 |

OTHER PUBLICATIONS

ProQuest User Guide; 2005; pp. 1-8.*
Diana Inkpen; Boolean and Vector Space Retrieval Models; 2005; pp. 1-5.*
Blumberg, Robert, et al., "Information Management: The Problem With Unstructured Data" [online], Feb. 1, 2003 [retrieved on Jul. 2, 2010], 6 pp., Retrieved From the Internet: http://license.icopyright.net/user/viewFreeUse.act?fuid=ODk3ODkyOQ%3D%3D.

* cited by examiner

*Primary Examiner* — Apu Mofiz
*Assistant Examiner* — Jermaine Mincey
(74) *Attorney, Agent, or Firm* — Dawn-Marie Bey; Bey & Cotropia PLLC (57) ABSTRACT

Methods and systems for formulating and executing concept-structured queries of unorganized data are described. One described method for searching an unstructured data set includes receiving at least one user specified category whose definition is unconstrained, receiving at least one user specified token associated with the at least one category, generating a boolean query associated with the at least one token and the at least one category, executing the boolean query against an unstructured data set to identify at least one article identifier associated with an article, and creating a result set comprising the at least one article identifier.

10 Claims, 10 Drawing Sheets

METHODS AND SYSTEMS FOR FORMULATING AND EXECUTING CONCEPT-STRUCTURED QUERIES OF UNORGANIZED DATA

STATEMENT REGARDING FEDERALLY SPONSORED RESEARCH OR DEVELOPMENT

Embodiments of the invention may have been conceived or first actually reduced to practice in the performance of work under the following Government contract: MDA972-03-9-0001, Research & Development Experimental Collaboration System (RDEC). As a result, the Government may have certain rights in those inventions.

FIELD OF THE INVENTION

The present invention relates generally to methods and systems for retrieving data. The present invention relates particularly to methods and systems for retrieving unstructured data based on specified categories.

BACKGROUND

Computer users have access to a wide variety of documents and other content. Finding a particular document in a large corpus of documents can be challenging. Fortunately, conventional search engines provide a mechanism for users to search a large corpus of documents and other content using a query. Unfortunately, the interface for specifying a query is either limited (e.g., a simple text string) or unintuitive (e.g., AND, OR, OR NOT). Also, once a result set is returned, it can be difficult to search within the result set for a specific sub-set of documents.

Typically, before a corpus of documents can be searched, the documents must be arranged in or associated with some type of structure. For instance, a group of web pages may need to be crawled and indexed before a search engine is able to search those documents. The indexing process can be time and resource intensive. Thus, the documents may not be available for retrieval for some period of time.

The difficulties posed to intelligence analysts, for example, typify the problem. Much of the data available to intelligence analysts resides in very large collections electronic data files of unstructured text, such as text messages, documents prepared on word processors, pages from Internet web sites, and electronically hosted transcripts of voice broadcasts, or conversational exchanges. Collections like these are used by intelligence analysts on a daily, or many times a day, basis to retrieve information needed to answer specific questions, and each question poses the daunting problem of searching through sometimes millions of items to retrieve those few items containing desired information.

Because the amount of time and effort necessary to analyze and encode unstructured text in a way that is amenable to handling within ordinary Data Base Management Systems (DBMSs) is insuperable in such an environment, there is a need for techniques that enable users to formulate and effectively execute queries of these large, unstructured data sets without prior rigorous structuring of descriptors of their content. Most of the available methods for doing this rely on prior indexing or meta-data tagging of all items in the collection. Such utilities suffer from two limitations. The first is that the requirement for indexing or other forms of tagging to support application of the search engine imposes a large burden in the form of pre-processing of all items in the collection. The second limitation is that the options afforded the user for formulation of the search are usually limited to creation of what amounts to at most a few well-formed expressions in the language of formal logic (propositional calculus). The syntactic constructs and semantic descriptions afforded the user are therefore highly constrained and frequently sub-optimal for the users' objective.

To meet the challenge posed by the necessity to sort through large collections of unstructured text, then, it is necessary to provide users with a document search capability that can execute queries that are:

(1) Fast enough to support iterative searches of documents without preliminary indexing or meta-data tagging of the documents to be searched; and (2) Intuitive enough to support formulation of simple, easily communicated procedures for: (a) specifying and setting up initial queries; and (b) interactively modifying and executing queries to improve effectiveness.

SUMMARY

Summary of the Problem

Referring to the Background, a need exists for an algorithm to provide a robust, easy to use tool for searching unstructured data to find articles of interest to a user.

Summary of the Solution

Embodiments of the present invention provide methods and systems for formulating and executing concept-structured queries of unorganized data. One embodiment of the present invention comprises a method for searching an unstructured data set comprising receiving at least one user specified category whose definition is unconstrained, receiving at least one user specified token associated with the at least one category, generating a boolean query associated with the at least one token and the at least one category, executing the boolean query against an unstructured data set to identify at least one article identifier associated with an article, and creating a result set comprising the at least one article identifier. In another embodiment, a computer-readable medium (such as, for example random access memory or a computer disk) comprises code for carrying out such a method.

These embodiments are mentioned not to limit or define the invention, but to provide examples of embodiments of the invention to aid understanding thereof. Embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein:

FIGS. 7 and 8 are screen shots of a user interface for displaying a result set and associated article in one embodiment of the present invention;

DETAILED DESCRIPTION

Embodiments of the present invention provide methods and systems for formulating and executing concept-structured queries of unorganized data.

ILLUSTRATIVE EXAMPLE

One illustrative embodiment of the present invention is a Boolean Manifold Query ("BMQ") system. An illustrative example of the BMQ system enables users to set up and execute retrieval of items from collections of unstructured text in a way that emulates the queries that might be possible were those items transformed into a structured data base. The system operates on a set of electronically encoded items (e.g., e-mail messages, electronically hosted transcripts of news items), which are referred to herein as "articles" and whose information content has neither been characterized nor structured. The system comprises two main modules: (1) a content description tool, and (2) a BMQ query engine.

The content description tool of the BMQ system provides a user with the capability to specify sets of tokens (e.g., text strings, phrases, etc.) whose co-occurrence in an item naturally suggests a high probability that the item will contain information of the kind sought. This content description tool is implemented as a graphical user interface ("GUI") that enables users to select the collection(s) of items against which a query will be applied and to specify the criteria for the selection of articles. The GUI prompts the user to describe items of likely interest by specifying: (a) different categories of words that might be found in items of interest; and (b) specific words, strings, or phrases within each category defined that would be expected to be found in items of likely interest.

The selection criteria may be expressed as a "Chinese Menu" of columns of words, character strings, or phrases. Each column represents a collection of descriptors, including, e.g. alternate spellings and synonyms or synonymous phrases or words, any one of which might be found in a document containing the information sought. When the user has created a set of categories with their entries, the GUI background processor creates a Standard BMQ Specification File (SSBF) that can be passed to other routines to effect the identification and retrieval of items that satisfy the user's specifications.

The SSBF is complemented by Standard Response Files (SRFs) that specify the content and format of reports of outputs from processes driven by the SSBF. This combination specifies a file out/file in interface between the GUI and any processing routines applied in the background. The system architecture is therefore completely modular, supporting ready integration of applications in any convenient language. The current implementation of the BMQ system includes, for example, calls to executable routines written in C, FORTH, and APL without conflict.

The BMQ Query Engine uses the user-supplied content descriptions to identify and retrieve articles of possible interest. The implicit specification of articles of possible interest in the descriptions created via the content description tool is that any article of interest shall contain at least one criterion from each of the columns built with the content description tool. Once the query is prepared, the BMQ executes a query via a highly efficient, proprietary routine which enables simultaneous conduct of what could easily be thousands, or even millions of Boolean expressions conjoined by "OR." The BMQ Query Engine also supports cascading of queries, so that the articles returned from one query can be further processed, using more sophisticated query capabilities, or creation of other columns in the content description tool to narrow the scope of the query, without repeating the original query against large collections of articles.

The combination of the system's intuitive GUI and the efficiency of its query engine thus creates a robust, easy to use tool for the all important step of sifting through unstructured data bases of hundreds of thousands of articles to find those articles whose content answers the analyst's specific questions. The illustrative system does so in a way that makes the facility look like the execution of DBMS (Database Management System) queries without the extensive, confining pre-processing necessary to create a structured data base.

This example is given to introduce the reader to the general subject matter discussed. The invention is not limited to this example.

System Architecture

Figure 1:
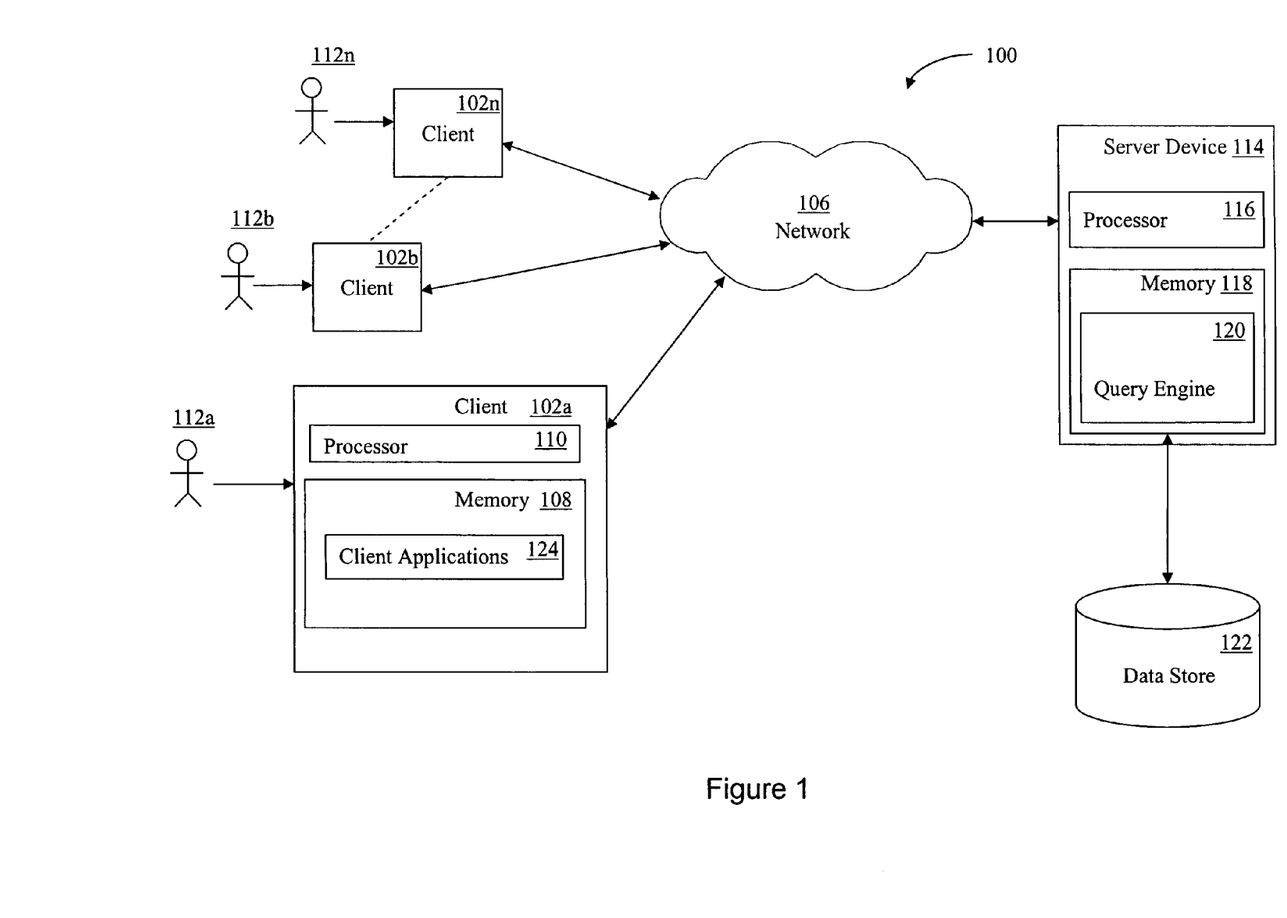
FIG. 1 is a block diagram illustrating an exemplary environment for implementation of one embodiment of the present invention.

Referring now to the drawings in which like numerals indicate like elements throughout the several figures, FIG. 1 is a block diagram illustrating an exemplary environment for implementation of one embodiment of the present invention. While the environment shown reflects a client-server architecture embodiment, other embodiments are possible.

The system 100 shown in FIG. 1 comprises multiple client devices 102a-n in communication with a server device 114 over a wired or wireless network 106. The network 106 shown comprises the Internet. In other embodiments, other networks, such as an intranet, may be used. Moreover, methods according to the present invention may operate within a single client or server device.

The client devices 102a-n shown each comprises a computer-readable medium 108. The embodiment shown comprises a random access memory (RAM) 108 coupled to a processor 110. The processor 110 executes computer-executable program instructions stored in memory 108. Such processors may comprise a microprocessor, an ASIC, a state machine, or other processor, and can be any of a number of computer processors, such as processors from Intel Corporation of Santa Clara, Calif. and Motorola Corporation of Schaumburg, Ill. Such processors comprise, or may be in communication with, media, for example computer-readable media, which stores instructions that, when executed by the processor, cause the processor to perform the steps described herein.

Embodiments of computer-readable media comprise, but are not limited to, an electronic, optical, magnetic, or other storage or transmission device capable of providing a processor, such as the processor 110 of client 102a, with computer-readable instructions. Other examples of suitable media comprise, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be connected to a network 106 as shown, or can be stand-alone machines. Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any operating system, such as Microsoft® Windows® or Linux, capable of supporting one or more client application programs. For example, the client device 102a shown comprises a personal computer executing client application programs, also known as client applications 124. The client applications 124 can be contained in memory 108 and can comprise, for example, a word processing application, a spreadsheet application, an e-mail application, a media player application, an instant messenger application, a presentation application, an Internet browser application, a calendar/organizer application, and any other application or computer program capable of being executed by a client device. The client applications 124 can also comprise a content description tool, such as the one described above in relation to the BMQ system. The user 112a can interact with the various client applications 124 via various input and output devices of the client device 102a.

Through the client devices 102a-n, users 112a-n can communicate over the network 106, with each other and with other systems and devices coupled to the network 106. As shown in FIG. 1, a server device 114 is also coupled to the network 106. In the embodiment shown, the client applications can transmit a query to the server device 114. Other configurations are also possible.

Similar to the client devices 102a-n, the server device 114 shown comprises a processor 116 coupled to a computer-readable memory 118. Server device 114, depicted as a single computer system, may be implemented as a network of computer processors. Examples of a server device 114 are servers, mainframe computers, networked computers, a processor-based device, and similar types of systems and devices. The server processor 116 can be any of a number of or combination of computer processors, such as processors from Intel Corporation of Santa Clara, Calif. and Motorola Corporation of Schaumburg, Ill.

Memory 118 contains the search engine application program, also known as a query engine 120. The query engine 120 locates relevant information in response to the categories specified on and received from a client device 102a. The query engine 120 then provides the result set to the client device 102a via the network 106. The result set comprises one or more article identifiers. As described above, an article identifier may be, for example, a URL, a file name, a link, an icon, a path for a local file, a database entry, or anything else that identifies an article. In the embodiment shown, an article identifier comprises a URL associated with an article. The result set may comprise text, audio, video or any other type of content.

The server device 114 shown also contains or is in communication with a data store 122. The query engine 120 can receive a query from the user 112a or generate a query and retrieve information from the data store 122 in response to the query.

The data store 122 can be any type of computer-readable media and can be integrated with the server device 114, such as a hard drive, or external to the server device 114, such as an external hard drive or on another data storage device accessed through the network 106. The data store 122 may comprise any one or combination of methods for storing data, including without limitation, arrays, hash tables, lists, and pairs.

In the embodiment shown in FIG. 1, a user 112a can enter categories and tokens into a search engine interface displayed on the client device 102a, which are subsequently sent to and received by the query engine 120. Based on the categories, the query engine 120 can locate relevant information in the data store 122 and provide a result set. In one embodiment, the result set comprises article identifiers identifying articles in the data store 122 that are associated with the query. In another embodiment, the result set also comprises identifiers identifying articles located on other devices. In yet another embodiment, the result set comprises identifiers related to other types of unstructured data in unstructured data sets. An unstructured data set may comprise articles in a folder or other storage location on a physical or logical disk drive, articles stored on a web server, articles stored in a database, or any other type of unstructured data stored in a data store.

An article identifier may be, for example, a Uniform Resource Locator (URL), a file name, a link, an icon, a path for a local file, an index in a database, or any other suitable article identifier. In the embodiment shown, an article identifier comprises a URL associated with an article.

Articles comprise, for example, word processor, spreadsheet, presentation, e-mail, instant messenger, transcripts of new items, database records, and other content files or groups of files, web pages of various formats, such as HTML, XML, eXtensible Hyptertext Markup Language (XHTML), Portable Document Format (PDF) files, and audio files, video files, or any other documents or groups of documents or information of any type whatsoever. Articles may be grouped in various ways. For instance, articles may be grouped together as messaging articles. Messaging articles stored in the data store 122 comprise users' emails, chat messages, instant messaging messages, and other types of electronic messages.

An embodiment of the present invention may also store message threads in the data store 122. In such an embodiment, messages are related together by various attributes, including, for example, the sender, recipient, date/time sent and received, the subject, the content, or any other attribute of the message. The related messages can then be retrieved as a thread, which may be treated as a single article.

It should be noted that embodiments of the present invention may comprise systems having different architecture than that which is shown in FIG. 1. For example, in some systems according to the present invention, server device 114 may comprise a single physical or logical server. The system 100 shown in FIG. 1 is merely exemplary, and is used to explain the exemplary method shown in FIG. 2.

Process

Various methods may be implemented in the environment shown in FIG. 1 and other environments, according to the present invention. Methods according to the present invention may be implemented by, for example, a processor-executable program code stored on a computer-readable medium.

Figure 2:
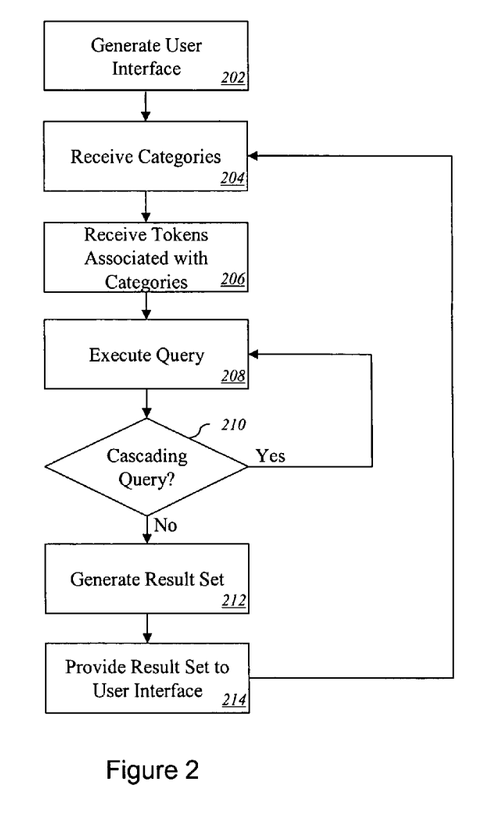
FIG. 2 is a flowchart illustrating a method for specifying categories and tokens and executing a query in one embodiment of the present invention.

FIG. 2 is a flowchart illustrating a method for specifying categories and tokens and executing a query in one embodiment of the present invention. In one embodiment of the present invention, a computer program generates a user interface 202. The user interface allows the user 112a to specify categories and tokens. The user interface may be provided to the user 112a on a client device 102a via a network 106.

The categories are descriptive of content that the user wishes to retrieve. For instance, the user may attempt to find articles related to a question. Various examples of user-specified categories and tokens are provided below. The categories are unconstrained, i.e., the user can specify any category and is not limited to a set of pre-defined categories. Once the user specifies the categories, the categories are received by the computer program 204.

Next, the user 112a specifies tokens within each category. The tokens are items whose co-occurrence in an article suggests a likelihood that the article will contain information of the kind sought by the user. Tokens may also be referred to as keywords. The token may take various forms. For example, the token may be specified as a text string. The text string may comprise a word, portion of a word, or phrase. Once the user specifies the tokens, the tokens are received by the computer program 206. Specification of categories and tokens may occur in various other ways in embodiments of the present invention. The process shown in FIG. 2 is merely illustrative.

For instance, a user 112a may wish to find articles related to the following question: "Which European Union countries support Turkey's admission?" The user specifies the following categories: EU Countries & Representatives, Subject, Objective 1, Objective 2, and Position. Then the user specifies the following tokens within each category:

EU Countries & Representatives—Belgium, Belgians, Britain, British, Denmark, Danish, Finland, Finish, etc.;

Subject—Turkey;

Objective 1—EU, European Union;

Objective 2—admission, accession, join, membership, becoming a member of; and

Position—supports, looks favorably on, endorses, will vote for.

In another example, a user wishes to find articles related to the following question: "Which Moslem clerics have spoken out publicly on the issue of suicide bombings?" To locate articles that may be relevant to the question, the user specifies the following categories and tokens:

| Titles/words associated with Islam clerics, including spelling variations | Words describing persons involved in the actions of interest | Words likely to be found in quotes or declarations on topic | Likely descriptors of the kind of statement sought |
|---|---|---|---|
| al-Sahykh | martyrs | bombers | opinion |
| Al-Sahykh | martyrdom | bombing | decree |
| Sahykh | suicide | killing | judgment |
| Shaykh | fedayeen | operations | declare |
| al-Shahykh | | car bombs | declaration |
| Al-Shahykh | | | fatwa |
| Sheikh | | | fatwah |
| Sheik | | | pronounce |
| Sheikh | | | pronouncement |
| Sheik | | | ruling |
| Imam | | | encourage |
| Imam | | | encouraging |
| ayatollah | | | discourage |
| Ayatollah | | | discouraging |
| ayatolla | | | saying |
| Ayatolla | | | |
| ayatullah | | | |
| Ayatullah | | | |
| mufti | | | |

Referring still to FIG. 2, the user 112a next provides an indication that the query should be executed. For instance, the user 112a may click a submit button. The computer program receives this indication, and in response, executes the query using the query engine (120) 208. The query is executed against data store 122. In one embodiment, the query engine 120 identifies articles that include at least one token from each of the specified categories. Other methods of executing the query may also be utilized.

The query engine 120 in the embodiment shown is capable of executing cascading queries. In a cascading query, articles returned from one query can be further processed, using more sophisticated query capabilities. For instance, additional columns may be specified in the content description user interface to narrow the scope of the result set returned by the first query, without repeating the original query against large collections of articles. In the embodiment shown, the computer program determines whether or not to execute a cascading query 210. The decision may be based on input from the user. For example, the user may enter categories and tokens and receive a result set with a large number of results. In response, the user may decide to enter additional categories and or exclusionary categories to narrow the result set without re-executing the initial query. The decision may instead be based on optimization routines within the query engine. For example, it may be more efficient to execute each query sequentially on a smaller and smaller set of articles.

If so, the computer executes the query 208 and determines whether an additional cascading query should be run 210. If not, the query engine 120 generates a result set 212. The result set in the embodiment shown is a list of article identifies that identify content present in the data store 122. As described above, the articles identifiers may be pointers to the data store 122 or pointers to some other data store, such as a web server. In other embodiments, the result set may comprise the actual articles of interest.

The computer program then provides the result set to the user 214. The result set may be provided to the user in various ways. For instance, in one embodiment, the user is provided with a list of article titles. The user can then click on a particular article title to display the full article. In the embodiment shown, the computer program can optionally repeat steps 204-214 to, for instance, narrow or broaden the result set provided to the user interface.

Illustrative User Interface

Figure 3:
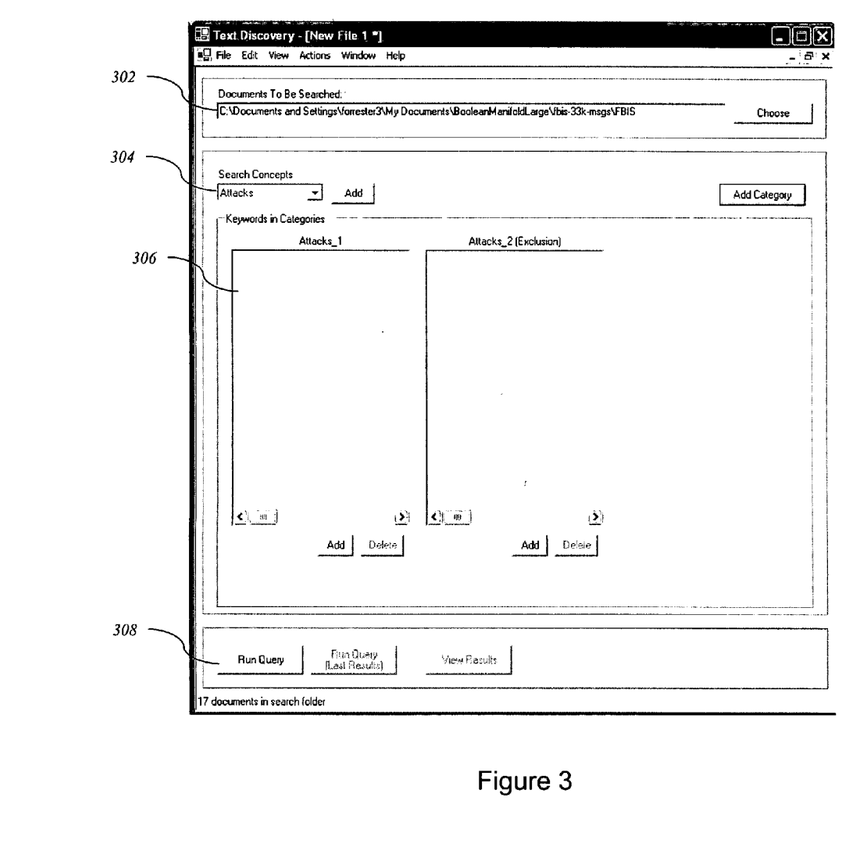
FIG. 3 is a screen shot of a content description tool in the embodiment shown in FIG. 2.

FIGS. 3-8 are screen shots of a user interface in one embodiment of the present invention. FIG. 3 is a screen shot of a content description tool in the embodiment shown. The user interface shown includes a field for specifying where the search is to be performed 302.

In the embodiment shown, the user can also specify concepts 304, which are associated with categories. For instance, in the embodiment shown, the selected concept is "Attacks." The concept "Attacks" is associated with two categories, "Attacks_1," and "Attacks_2 (Exclusion)." For each of the categories in the concept, the user can add tokens. When added, the tokens appear in the list controls on the screen 306.

Once the user has specified the categories and tokens, the user can submit the query to be executed. In the embodiment shown, the user submits the query by clicking the "Run Query" button 308.

Figure 4:
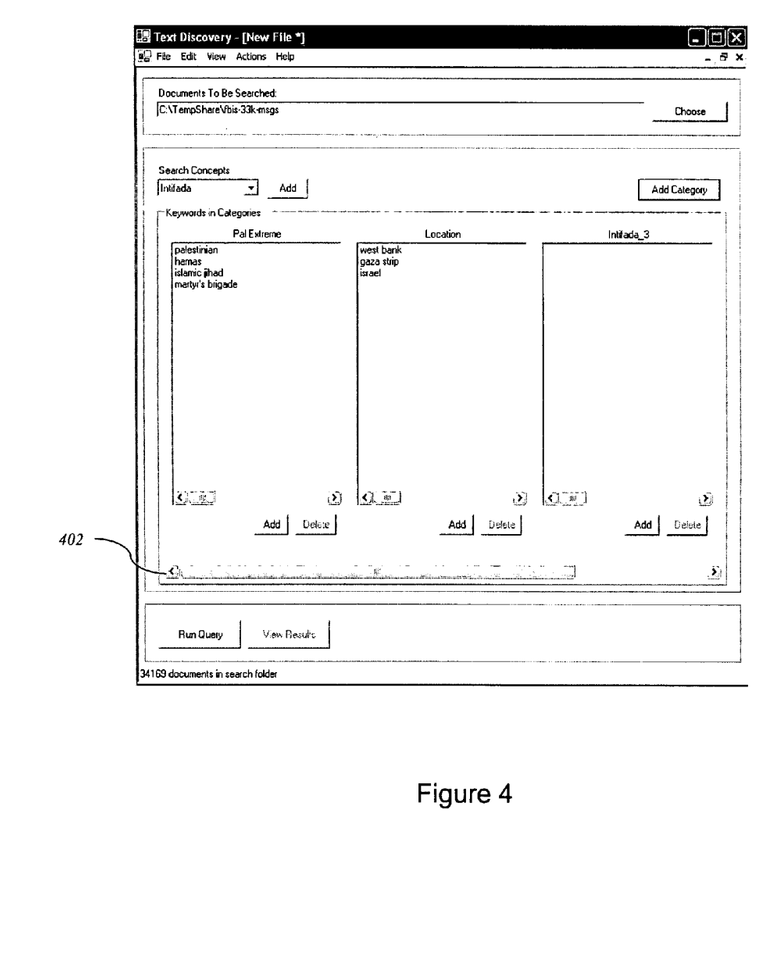
FIGS. 4 and 5 are screen shots of the user interface shown in FIG. 3.
Figure 5:
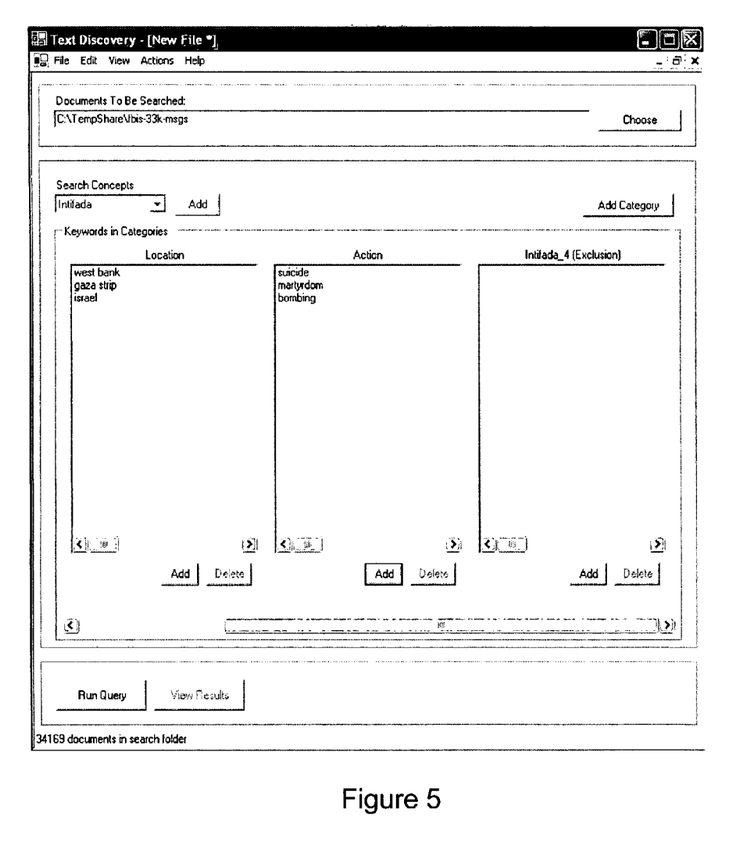

FIGS. 4 and 5 are screen shots of the user interface shown in FIG. 3. In FIGS. 4 and 5, the user has selected the concept "Infitada." The embodiment shown allows the user to view three categories at a time on the screen. However, the concept includes five categories. The user utilizes the scroll bar 402 to display the various categories.

Figure 6:
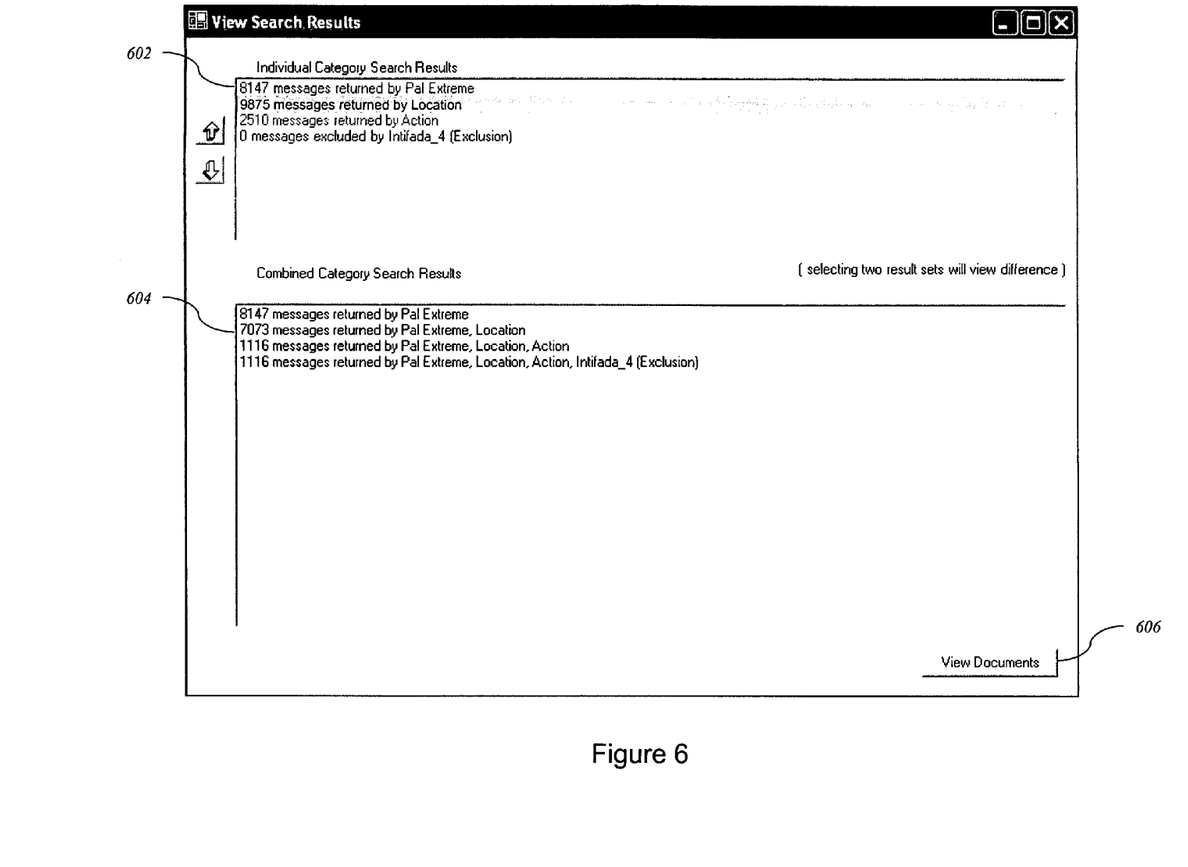
FIG. 6 is a screen shot of a user interface for displaying the processing of a query in one embodiment of the present invention.

FIG. 6 is a screen shot of a user interface for displaying the processing of a query in one embodiment of the present invention. In the embodiment shown, the number of articles associated with each category is displayed at the top of the user interface 602. The number of articles associated with the combined categories is displayed at the bottom 604. Once the query executes, the user can view the result set by clicking the "View Documents" button 606.

Figure 7:
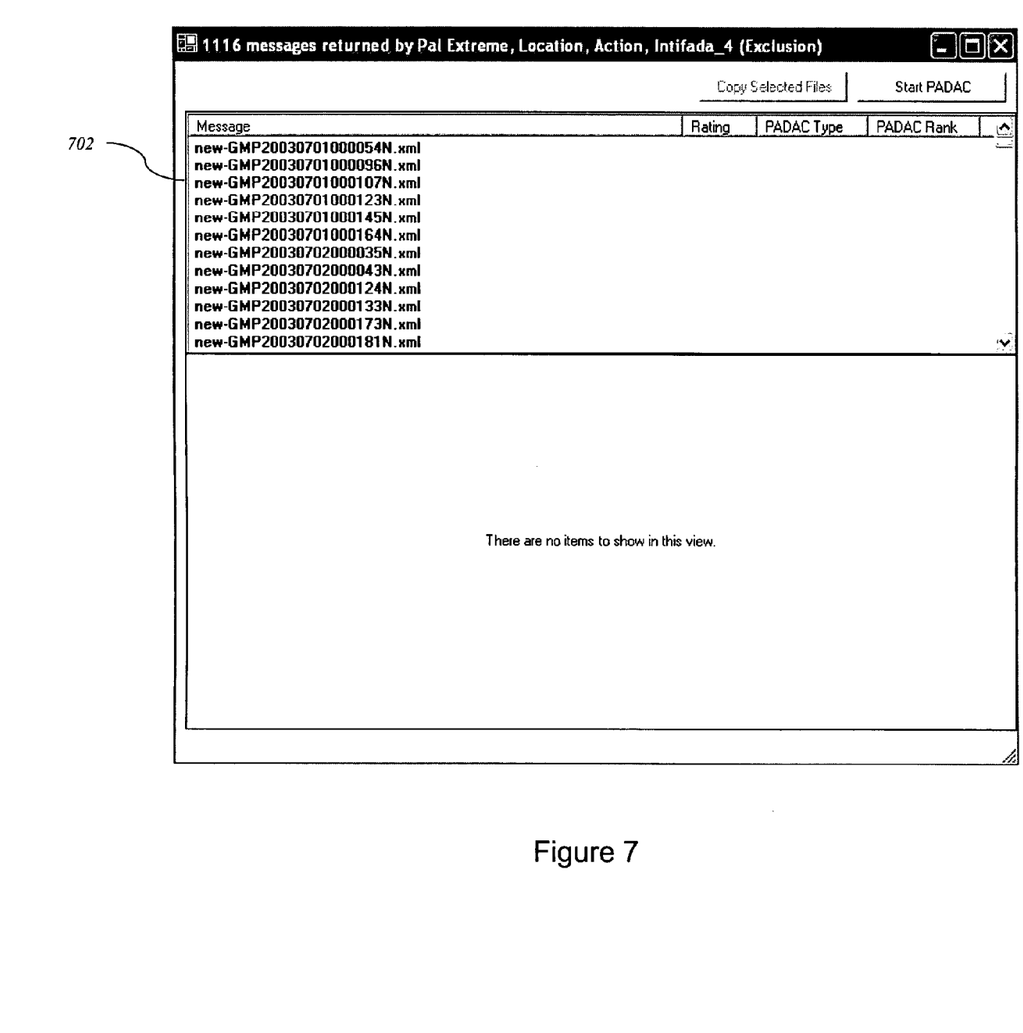

FIGS. 7 and 8 are screen shots of a user interface for displaying a result set and associated article in one embodiment of the present invention. In the embodiment shown, the result set is displayed in the top pane of the user interface 702. Then, when a user clicks on a particular result in the result set, the article itself is displayed in the lower pane 802.

Query Engine

The query engine 120 may be implemented in various ways. For instance, in one embodiment, the query engine enforces three rules for handling user-specified content descriptions: (1) singleton sets represent strings that must appear in every item selected; (2) when a string appears in a set with others, it is sufficient for any one of the strings listed to appear in a selected item; and (3) none of the strings in an excluded set may appear in an item selected.

Figure 9:
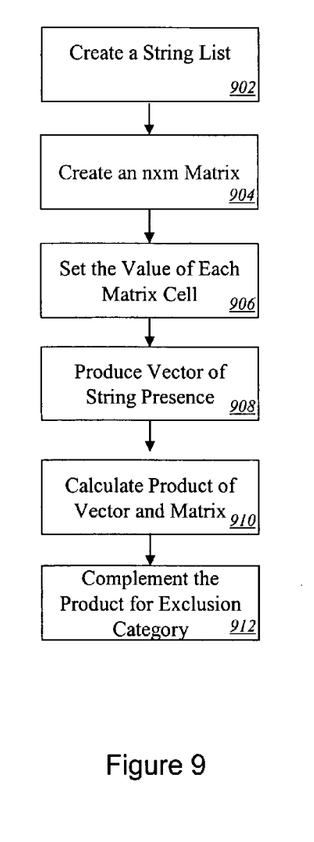
FIG. 9 is a flow chart illustrating one illustrative implementation of a query engine in one embodiment of the present invention.

FIG. 9 is a flow chart illustrating one illustrative implementation of a query engine in one embodiment of the present invention. In the embodiment shown, the query engine 120 first creates a string list—S={$S_i$: i=1, . . . ,n} 902.

The query next creates an n×m matrix, M={$M_{ij}$} 904. In the matrix, i indexes the list of strings, and j indexes m categories of strings defined via a content description tool of the type described above. The query engine then sets the value of each cell of the matrix 906. The values of the cells of the matrix are set as follows:

$M_{ij} = 1$ if the $ith$ string appears in the $jth$ category list, and $M_{ij} = 0$ otherwise.

The query engine then tests each article in turn for the presence of strings, producing a vector V of length n in which: $V_i$=1 if $S_i$ appears in the item, and 0 if not 908. The query engine next determines the product $P_j=V_i \times M$ 910. If an exclusion category has been added, the query engine determines the complement $P_j$ for the value of j corresponding to the exclusion category 912.

ILLUSTRATIVE EXAMPLES

The following two examples illustrate a question that a user may pose, the categories and tokens related to the question, and the matrices and products that result when the query engine is executed in one embodiment of the present invention.

In a first example, a user wishes to identify all articles associated with the following question: "When and Where Can I see an animal?" The user specifies three categories: Category 1, Category 2, and Category 3.

The user next specifies tokens for the three categories as follows:

Category 1: 'dog', 'cat', 'bear'
Category 2: 'house', 'yard', 'forest', 'zoo'
Category 3: 'day', 'night'

The query engine uses these categories and tokens to search articles. For the purposes of this example, assume that the articles in the data store include the following text:

Article 1: We have a house cat that doesn't go out at night.
Article 2: Our dog often barks in the yard.
Article 3: The other day I saw a bear at the zoo.
Article 4: Some cats rummage through our garbage at night.

The query engine then generates a matrix M as follows:

|   | S | M |
|---|---|---|
| 1 | dog | 1 0 0 |
| 2 | cat | 1 0 0 |
| 3 | bear | 1 0 0 |
| 4 | house | 0 1 0 |
| 5 | yard | 0 1 0 |
| 6 | forest | 0 1 0 |
| 7 | zoo | 0 1 0 |
| 8 | day | 0 0 1 |
| 9 | night | 0 0 1 |

The query engine calculates the vector and product as follows:

| $V_i$: | $V_i \times M$: |
|---|---|
| i = 1 2 3 4 5 6 7 8 9 s | |
| 0 1 0 1 0 0 0 0 1 | 1 1 1 |
| 1 0 0 0 1 0 0 0 0 | 1 1 0 |
| 0 0 1 0 0 0 1 1 0 | 1 1 1 |
| 0 1 0 0 0 0 0 0 1 | 1 0 1 |

In another example, a user wishes to identify all articles associated with the following question: "When and where can I see a wild animal?" The user specifies the same categories and tokens as are specified above. The user also specifies an exclusionary category that includes dog and cat.

The query engine then generates a matrix M as follows:

|   | S | M |
|---|---|---|
| 1 | dog | 1 0 0 1 |
| 2 | cat | 1 0 0 1 |
| 3 | bear | 1 0 0 0 |
| 4 | house | 0 1 0 0 |
| 5 | yard | 0 1 0 0 |
| 6 | forest | 0 1 0 0 |
| 7 | zoo | 0 1 0 0 |
| 8 | day | 0 0 1 0 |
| 9 | night | 0 0 1 0 |

The query engine calculates the vector, product, and complement as follows:

| $V_i$: | $V_i \times M$: |
|---|---|
| i = 1 2 3 4 5 6 7 8 9 s | |
| 0 1 0 1 0 0 0 0 1 | 1 1 1 0 (=~1) |
| 1 0 0 0 1 0 0 0 0 | 1 1 0 0 (=~1) |
| 0 0 1 0 0 0 1 1 0 | 1 1 1 1 (=~0) |
| 0 1 0 0 0 0 0 0 1 | 1 0 1 0 (=~1) |

In another embodiment, the BMQ ameliorates the problem of information retrieval from large collections of unstructured text by affording its users capabilities to:

(1) Conceptualize and define categories of alphanumeric strings that (a) might appear in an item in a collection (names of persons, names of countries, locations, relationships, etc.), or (b) should not appear in any item selected (e.g., an exclusion list);

(2) Specify for each category sets of strings (e.g., words, parts of words, letter sequences, number sequences, series of words, etc.) that reasonably might appear or should not appear in an item of interest from the collection;

(3) Automatically generate the expression in Boolean logic describing any item satisfying the conditions described by the framework set up in (1) and (2) and execute a Boolean query to retrieve items satisfying that description; and (4) Interactively define and execute refinements of the original query results within the framework set by (1) and (2) to recursively enhance query precision for the items sought.

The BMQ in such an embodiment is adapted to iterate between steps (3) and (4) for any corpus of articles. The BMQ enables the user to begin with a query that is broad enough to return a high percentage of items of interest in a sub-corpus, then iteratively refine filters that act on the sub-corpus originally returned to reduce it to one with high precision, without re-executing the original query. In one embodiment, the BMQ is adapted to be applied to a corpus of items retrieved using a native query facility with direct access to the collection(s) to be queried. The items retrieved with the native query facility are then imported into a local environment, where the BMQ can be applied directly.

Thereafter, the user works through a GUI to specify more precise queries and/or sub-queries of the items originally returned. In this mode, the user can also call and apply search aids, such as: query-by-example tools that order items returned by their semantic or contextual similarity to exemplars containing the information sought; finer-grained query criteria, such as additional specification of order of appearance or proximity words; extensions of the categories to apply finer filters; or imposition of restrictions to sub-sets of items in the original categories, to temporarily reduce the number of items of possible interest to be reviewed.

Once the first BMQ structured query has been run against a collection of items, execution of refinements like these is fast enough to support interactive use of the system.

In one embodiment of the BMQ GUI, browsing of the items returned by any query launched through the GUI is supported in the GUI by such features as: summaries of numbers of items returned by category and combinations of categories; maintenance of ordered directories of items, showing which have already been viewed; facilities for viewing each item in a directory with the strings matched from each category highlighted in different colors; capabilities to select and store, or select and store extracts from, found to contain relevant information; and capabilities to select and store exemplars to be used in query-by-example routines applied in the background.

Figure 10:
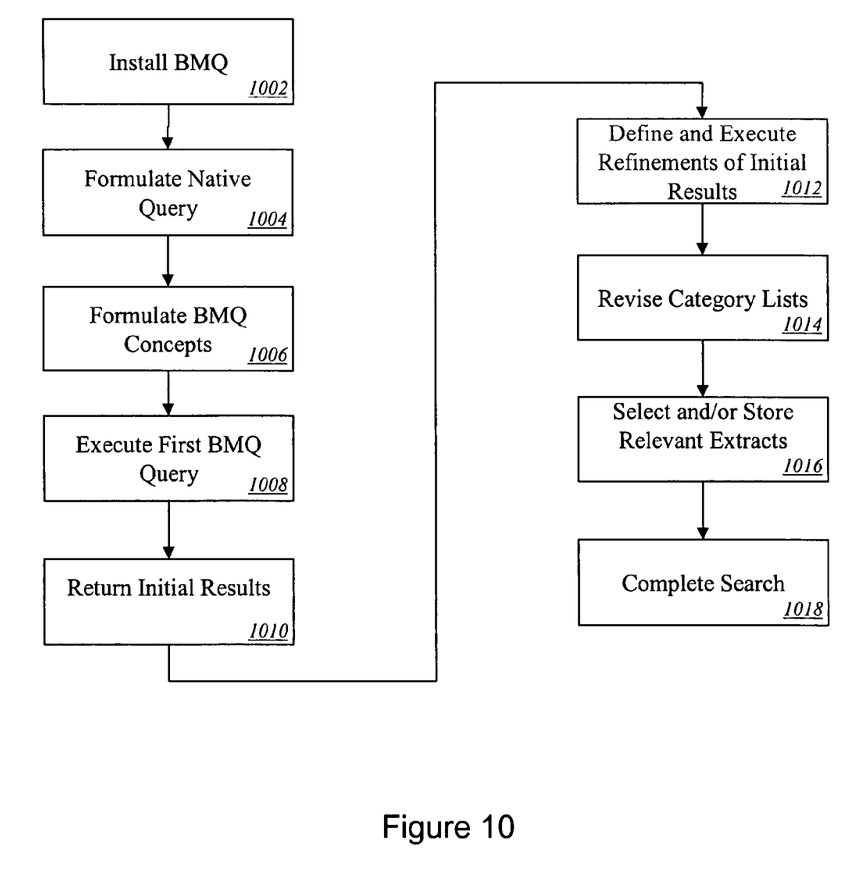
FIG. 10 is a flowchart illustrating a use of one embodiment of a BMQ according to the present invention.

FIG. 10 is a flowchart illustrating a use of one embodiment of a BMQ according to the present invention. In the embodiment shown, the user installs the BMQ facility on a local computer or one that can be reached as a remote desktop 1002.

The user next studies the question to be answered to formulate queries to shared databases using the native query capabilities to retrieve all items likely to contain information of value in answering that question 1004. This query is relaxed enough to assure retrieval of the majority of items likely to have information of the kind sought, but restrictive enough to result in a total return that can be stored in a selected local environment.

The user further studies the question to be answered to formulate the concept on which the BMQ will be based 1006. This concept comprises a set of categories of terms and a list within each category of the specific words, parts of words, or phrases that would be expected in an item likely to contain information of value.

The first BMQ query is executed 1008. The query returns an identifier for each item that contains at least one of elements from the list for each category 1010. Through the GUI, the user browses the items identified, supported by a display of the contents of each item with the words that matched from each category list highlighted. The color for the identifier for each item viewed is changed from black to gray, to help the user keep track of what has been done.

As appropriate the user defines and executes refinements of the original query 1012. Options for such refinements may include, but are not limited to:

(a) Additions to the exclusion category to eliminate from consideration items sure not to be of interest;

(b) Creation of additional categories and their lists to tighten the criteria for inclusion of items as ones likely to be of interest;

(c) Modification of the lists for any categories to change the criteria for inclusion of items;

(d) Selection of items to serve as exemplars for query-by-example routines;

(e) Application of query-by-example routines to re-order the list of identifiers of items returned; and (f) Application of any number of refinements of criteria for inclusion.

When additional categories are created, their lists may, without ambiguity, comprise or include portions from the lists from the original query. Such duplications will have the effect of reducing the items returned to include only the part listed. Moreover, any number of additional categories can be added, and the lists in any additional category, including the exclusion category, can be edited.

When the user feels that it necessary to add something to the list for any one of the original query categories, the necessary additions can be made through the GUI 1014. In one embodiment, the user is then informed that it will be necessary to re-run the BMQ against the local corpus of items to make the necessary adjustment.

As items with relevant information are discovered, the user can select and store those items or select and store relevant extracts from those items 1016.

The search process continues until the user has discovered and extracted all information necessary to formulate an answer to the question, all items returned have been reviewed, it becomes apparent that the items remaining to be reviewed are unlikely to contain information of value, or time constraints dictate a termination of the search effort and preparation of the response 1018.

Applications and Advantages

Embodiments of the present invention may be utilized in a variety of applications. For instance, an embodiment of the present invention may be used as a front end for other search engines or as a stand-alone application. Such embodiments might be employed as an enterprise search solution. They may be used in application in which there is a steady stream of data that is monitored for relevance either rarely (e.g. list server archives) or on some basis (e.g. daily) where it is not worthwhile to constantly index.

Embodiments of the present invention provide numerous advantages over conventional search engines. For instance, a content description tool according to various embodiments of the present invention allows the query process to be more intuitive for users and can be considered as an "employed Boolean phrase constructor." The nature of such a Content Description tool allows users to formulate queries in a nature that closely parallels the way humans would normally formulate queries and does not limit the Boolean manifold that may be specified. In this way, the tool provides a simple method for creating long Boolean expressions for queries. This, in turn, helps generate hits that are more relevant and helpful for the user.

The query engine provides systems and methods for running a user's query on an unstructured dataset, without needing to preprocess or index the dataset. By avoiding index creation, such an embodiment is more flexible than conventional search engines and eliminates much of the processing resources required to index a corpus of documents.

Further the results obtained from the query engine may be "tuned" in some embodiments of the present invention. This is described above as executing cascading queries.

General

The foregoing description of the embodiments of the invention has been presented only for the purpose of illustration and description and is not intended to be exhaustive or to limit the invention to the precise forms disclosed. Numerous modifications and adaptations thereof are apparent to those skilled in the art without departing from the spirit and scope of the present invention.

That which is claimed:

1. A computer-implemented method for searching an unstructured and uncharacterized collection of articles stored in at least one computer readable medium, the method comprising:
    receiving by the computer at least two user specified categories whose definitions are not constrained;
    receiving by the computer at least one user specified token associated with each of the at least two categories, wherein the user specified tokens are different for each category;
    generating a boolean query associated with the combination of the at least two categories and the user specified tokens;
    executing by the computer the boolean query against the unstructured and uncharacterized collection of articles including unstructured text to identify at least one article that includes the user tokens from the at least two categories and generating for any identified at least one article an identifier associated with the article, wherein the article identifier comprises information that points to the article; and
    creating a result set comprising the at least one article identifier.

2. The computer-implemented method of claim 1, wherein the at least one token comprises a plurality of tokens.

3. The computer-implemented method of claim 1, wherein the unstructured text comprises at least one of: a folder on a physical or logical drive, a web server, or a database.

4. The computer-implemented method of claim 1, wherein the at least one article identifier comprises one of: a Uniform Resource Locator ("URL"), a file name, a link, an icon, a path for a local file, or a database entry.

5. The computer-implemented method of claim 1, wherein generating the boolean query comprises:
    creating a string list, each element of the string list associated with the at least one token;
    generating a matrix having a first dimension and a second dimension, wherein the first dimension is associated with the string list and the second dimension is associated with the at least one category;
    setting each cell of the matrix equal to a first value if the string associated with the cell is in the category associated with the cell and a second value if not;
    determining a vector reflecting the presence of a token in the article; and
    determining the product of the vector and the matrix.

6. The computer-implemented method of claim 5, further comprising if one of the at least one categories comprises an exclusion category, determining a complement of the vector for the exclusion category.

7. The computer-implemented method of claim 1, wherein the result set comprises a first result set and further comprising executing a cascading query on the first result set to generate a second result set.

8. The computer-implemented method of claim 1, further comprising providing the result set to a user interface.

9. The computer-implemented method of claim 8, further comprising:
    receiving a selection of one of the at least one article identifiers from the result set; and
    providing the article associated with the one of the at least one article identifiers to the user interface.

10. A computer-implemented method for searching an unstructured and uncharacterized collection of articles stored in at least one computer readable medium, the method comprising:
    receiving by the computer at least one user specified category whose definition is not constrained;
    receiving by the computer at least one user specified token associated with the at least one category;
    creating a first file that includes category and token selections;
    generating a boolean query associated with the combination of the at least one category and the at least one token using the first file;
    executing by the computer the boolean query against the unstructured and uncharacterized collection of articles including unstructured text to identify at least one article that includes the at least one token and generating for any identified at least one article an identifier associated with the article, wherein the article identifier comprises information that points to the article; and creating a result set comprising the at least one article identifier in accordance with format requirements specified by a second file.

\* \* \* \* \*